(12) United States Patent
Hiyoshi

(10) Patent No.: US 6,643,632 B1
(45) Date of Patent: Nov. 4, 2003

(54) DATA PROCESSING SYSTEM AND COMPUTER-READABLE RECORDING MEDIUM RECORDED WITH A PROGRAM FOR CAUSING A COMPUTER TO PROCESS DATA

(75) Inventor: Kiyomitsu Hiyoshi, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/451,600

(22) Filed: Nov. 30, 1999

(30) Foreign Application Priority Data

Feb. 23, 1999 (JP) .......................................... 11-045299

(51) Int. Cl.⁷ ............................................. G06F 17/30
(52) U.S. Cl. ................................. 707/1; 707/7; 707/200
(58) Field of Search ................................. 707/1, 2, 3, 4, 707/200, 7, 100, 10; 709/201

(56) References Cited

U.S. PATENT DOCUMENTS

| | | | |
|---|---|---|---|
| 5,675,789 A | * 10/1997 | Ishii et al. | 707/204 |
| 5,745,897 A | * 4/1998 | Perkins et al. | 707/101 |
| 5,828,885 A | * 10/1998 | Raman | 717/137 |
| 5,832,524 A | * 11/1998 | Jarvenpaa | 707/204 |
| 5,842,207 A | * 11/1998 | Fujiwara et al. | 707/7 |
| 5,900,007 A | * 5/1999 | Nunnelley et al. | 711/4 |
| 6,185,665 B1 | * 2/2001 | Owada et al. | 711/170 |
| 6,260,049 B1 | * 7/2001 | Fitzgerald et al. | 707/104 |

FOREIGN PATENT DOCUMENTS

JP    4287140    10/1992

OTHER PUBLICATIONS

Gio Wiederhold, "Database Design", Second Edition, McGraw–Hill Book Company, 1983, pp. 94–103.*

* cited by examiner

Primary Examiner—John E. Breene
Assistant Examiner—Cheryl Lewis
(74) Attorney, Agent, or Firm—Greer, Burns & Crain, Ltd.

(57) ABSTRACT

The present invention discloses a data processing system in which system data is divided and stored in the plurality of output files. In the data processing system, a maximum capacity of data is set corresponding to each of a plurality of output files in accordance with information from an external unit. It is judged whether a total volume of data stored in a current output file, which is one of the plurality of output files, reaches said maximum capacity corresponding to the current output file when data is processed and stored in the current output file. Moreover, the current output file is switched to another of the plurality of output files when the total volume of data stored in the current output file reaches the maximum capacity corresponding to the current output file.

6 Claims, 9 Drawing Sheets

FIG. 3

| i | OUTPUT FILE ADDRESS | MAXIMUM NUMBER OF RECORDS |
|---|---|---|
| 1 | $AD_1$ | $N_1$ |
| 2 | $AD_2$ | $N_2$ |
| 3 | $AD_3$ | $N_3$ |
| | | |
| n | $AD_n$ | $N_n$ |

FIG. 4

| BRANCH OFFICE NAME | DATE | UNIT PRICE OF PRODUCT 1 | UNITS SOLD OF PRODUCT 1 | GROSS SALES OF PRODUCT 1 | UNIT PRICE OF PRODUCT 2 | UNITS SOLD OF PRODUCT 2 | GROSS SALES OF PRODUCT 2 | TOTAL SALES OF PRODUCTS 1 AND 2 |
|---|---|---|---|---|---|---|---|---|
| A | 199801 | 00250 | 00124 | 00031000 | 01320 | 00012 | 00015840 | 00046840 |
| A | 199802 | 00250 | 00090 | 00022500 | 01320 | 00022 | 00029040 | 00051540 |
| A | 199803 | 00250 | 00033 | 00008250 | 01320 | 00009 | 00011880 | 00020130 |
| A | 199804 | 00250 | 00101 | 00025250 | 01320 | 00003 | 00003960 | 00029210 |
| A | 199805 | 00250 | 00100 | 00025000 | 01320 | 00002 | 00002640 | 00027640 |
| A | 199806 | 00250 | 00055 | 00013750 | 01320 | 00004 | 00005280 | 00019030 |
| A | 199807 | 00250 | 00023 | 00005750 | 01320 | 00005 | 00006600 | 00012350 |
| A | 199808 | 00250 | 00033 | 00008250 | 01320 | 00007 | 00009240 | 00017490 |
| A | 199809 | 00250 | 00044 | 00011000 | 01320 | 00009 | 00011880 | 00022880 |
| A | 199810 | 00250 | 00088 | 00022000 | 01320 | 00012 | 00015840 | 00037840 |
| A | 199811 | 00250 | 00097 | 00024250 | 01320 | 00010 | 00013200 | 00037450 |
| A | 199812 | 00250 | 00104 | 00026000 | 01320 | 00022 | 00029040 | 00055040 |

DATA PROCESSING SYSTEM AND COMPUTER-READABLE RECORDING MEDIUM RECORDED WITH A PROGRAM FOR CAUSING A COMPUTER TO PROCESS DATA

BACKGROUND OF THE INVENTION

1. Field of the Invention

The present invention generally relates to data processing systems and computer-readable recording media recorded with a program for causing a computer to process data such that data is stored in files, and more particularly to a data processing system and a computer-readable recording medium recorded with a program for causing a computer to process data, which is obtained by predetermined steps including sorting and merging steps, so that the data is divided and stored into a plurality of files.

2. Description of the Related Art

Conventionally, in a case of storing a large volume of data in files, a data processing system is provided such that a plurality of physical files are assigned to one logical file in accordance with volume of data (the number of additional records) to store. For example, a detailed description of the data processing system is found in Japanese Laid-open Patent Application No.4-287140.

In this conventional data processing system, a user stores one logical file having a relatively large volume of data into a plurality of physical files without management thereof.

Also, there is another conventional data processing system which can store following data into a next file indicated by a user when a volume of stored data in a current file reaches the maximum capacity for the current file defined by a file system or when a disk does not have enough storage space to store more data. Thus, it is possible to complete storage of an entire large volume of data by indicating the next file even if the current file in the process of storing data can not complete storage of the entire large volume of data.

In such conventional systems mentioned above, the systems define the size (maximum space available) of each file to store divided data. However, the systems do not allow a user to arrange the size of each file that is used to store divided data. Accordingly, it is not possible for the user to define a plurality of output files beforehand at once and arrange beforehand the size thereof in accordance with storage media that are to store the large volume of data.

Moreover, in the conventional systems in which data from a database is stored in a plurality of output files by dividing, it is not taken in consideration that a large volume of data could be sorted by predetermined categories and divided based on the categories to create secondary databases. Accordingly, in this case, in order to make desired secondary databases, the user has to retrieve desired data from the large volume of data for each output file and save the desired data in a corresponding output file as one of the secondary databases.

SUMMARY OF THE INVENTION

It is a general object of the present invention to provide a data processing system in which the above-mentioned problems are eliminated.

A more specific object of the present invention is to provide a data processing system that allows a user to provide information about output files and the size of each output file and that divides data and outputs divided data into the output files in accordance with the information provided by the user.

Another object of the present invention is to provide a computer readable-recording medium recorded with a program for causing a computer to process data, which is obtained by predetermined steps including sorting and merging steps, so that the data is divided and stored in a plurality of output files.

The above objects of the present invention are achieved by a data processing system for processing a set of data, the data processing system including: a maximum capacity setting part setting a maximum capacity of data corresponding to each of a plurality of output files in accordance with information from an external unit; a judging part judging whether a total volume of data stored in a current output file, which is one of the plurality of output files, reaches the maximum capacity corresponding to the current output file when data is processed and stored in the current output file; and an output file switching part switching the current output file to another of the plurality of output files when it is judged that the total volume of data stored in the current output file reaches the maximum capacity corresponding to the current output file, whereby the set of data is divided and stored in the plurality of output files.

According to the present invention, the maximum capacity is set for each of the plurality of output files. Then, the data is processed and stored into a current output file. When the total volume of data stored in the current output file reaches the maximum capacity, the data processing system switches the current output file to another of the plurality of output files. Therefore, it is possible to divide the set of data in accordance with the maximum capacity of each of the plurality of output files and to store the set of data therein by switching the plurality of output files in sequence.

Moreover, the above objects of the present invention are achieved by a computer-readable recording medium recorded with a program for causing a computer to process a set of data, the program including the codes of: (a) setting a maximum capacity of data corresponding to each of a plurality of output files in accordance with information from an external unit; (b) judging whether a total volume of data stored in a current output file, which is one of the plurality of output files, reaches the maximum capacity corresponding to the current output file when data is processed and stored in the current output file; and (c) switching the current output file to another of the plurality of output files when it is judged that the total volume of data stored in the current output file reaches the maximum capacity corresponding to the current output file, whereby the set of data is divided and stored in the plurality of output files.

According to the present invention, a computer-readable recording medium recorded with a program for causing a computer to process a set of data is provided to divide the set of data in accordance with the maximum capacity of each of the plurality of output files and to store the data therein by switching the plurality of output files in sequence.

BRIEF DESCRIPTION OF THE DRAWINGS

Other objects, features and advantages of the present invention will become more apparent from the following detailed description when read in conjunction with the accompanying drawings, in which:

FIG. 3 is a diagram illustrating a table of each output file address and the maximum number of records possible to store in an output file indicated by the output file address;

FIG. 4 is a diagram showing an example of a database structure that is processed by the output file controlling process;

DESCRIPTION OF THE PREFERRED EMBODIMENTS

A description will now be given of embodiments of the present invention with reference to figures.

Figure 1:
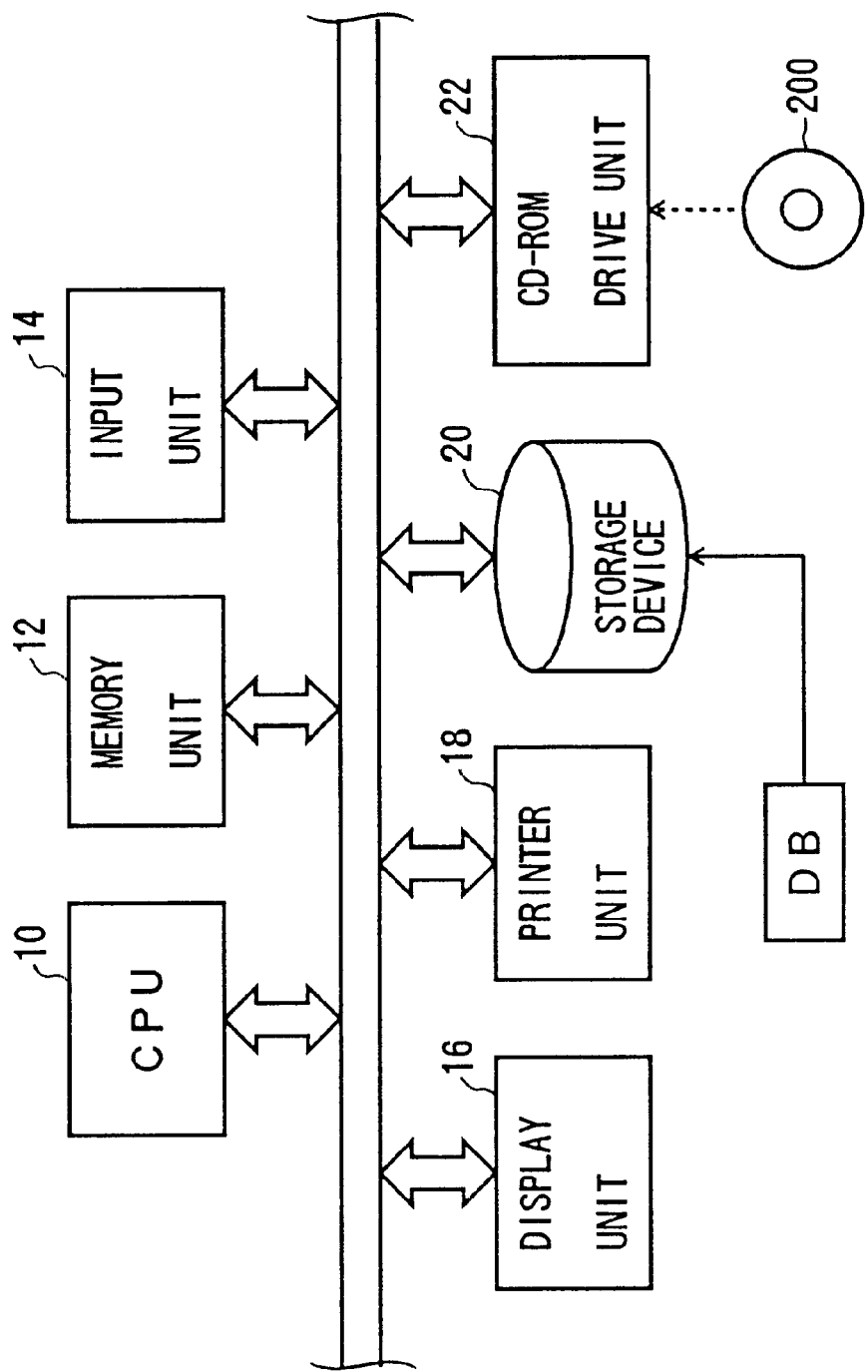
FIG. 1 is a block diagram illustrating a hardware construction of a computer system including an output file controlling apparatus according to an embodiment of the present invention.

A computer system, which includes a data processing system according to the present invention, is constructed of hardware such as shown in FIG. 1. The computer system includes basic data processes such as a data sorting process, a data merging process, a data copying process and the like.

In FIG. 1, the computer system includes a CPU 10, a memory unit 12, an input unit 14, a display unit 16, a printer unit 18, a storage device 20 and a CD-ROM drive unit 22 which are connected to a bus. The CPU 10 controls the entire system in accordance with a program stored in the memory unit 12 and executes data processes including the data sorting process, the data merging process and the data copying process as mentioned above. In addition, the CPU 10 executes an output file controlling process that will be described later. The memory unit 12 includes a ROM and a RAM. Also, the memory unit 12 stores temporarily programs, tables, various data and the like during the processes. The input unit 14 includes a keyboard and a mouse for a user to input information to the system, but is not limited to only these input devices.

The display unit 16 displays menus of various processes, results of processes, or the like. The printer unit 18 prints out data from the memory unit 12 in accordance with a print instruction of the CPU 10 based on a user operation from the input unit 14.

The storage device 20 is constructed of a hard disk unit and stores various files and programs. Also, the storage device 20 stores various databases provided from recording media or communication systems. In accordance with instructions from the CPU 10, the CD-ROM drive unit 22 reads information from the CD-ROM 200 set in the CD-ROM drive unit 22 and then provides the information to the storage device 20. For example, programs according to the above-mentioned data processes and a program according to the output file controlling process are provided by the CD-ROM 200. That is, programs read from the CD-ROM 200 are installed into the storage device 20 through the CD-ROM drive unit 22. Also, the various databases may be provided to the system by the CD-ROM 200. It should be noted that a recording medium is not limited to a CD-ROM, but other computer-readable recording media such as a magnetic disk, a magnetic tape, an optical disk, an optical magnetic disk, a semiconductor memory or the like may be used.

When a process is indicated by the input unit 14, a program corresponding to the process is loaded from the storage device 20 into the memory unit 12. The CPU 10 executes the process in accordance with the program loaded into the memory unit 12.

Figure 2:
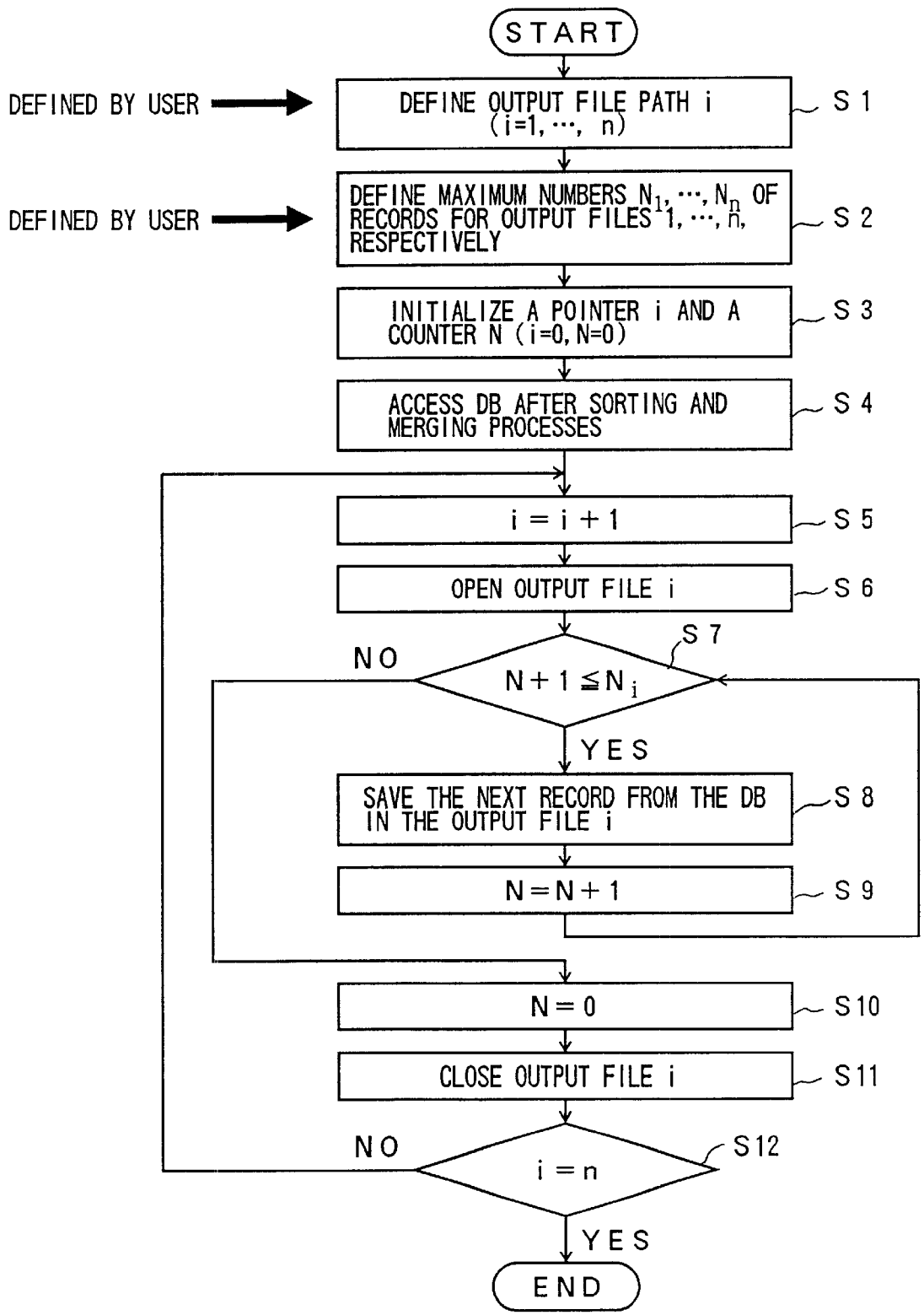
FIG. 2 is a flowchart showing an example of an output file controlling process.

The CPU 10 executes the output file controlling process in accordance with steps as shown in FIG. 2. In an example according to the output file controlling process, a plurality of databases provided from external units are merged (a merging and sorting processes). Then, records of the databases are sorted based on an indicated key and stored in output files. It should be noted that the external units may generate information based on a user's input operations of an input device such as a keyboard, a mouse or the like, or based on operations of other systems (other computer systems).

In FIG. 2, a plurality of output files are defined based on information entered from the input unit 14 operated by a user. Then, an output file path i (i=1, . . . ,n) is defined in step S1. Subsequently, maximum numbers $N_1$ through $N_n$ of records, which are defined by a user using the input unit 14 in accordance with the defined output files, are defined in step S2. The defined output files 1 through n and the maximum numbers $N_1$ through $N_n$ of records for the defined output files 1 through n correspond to each other in a table such as a table shown in FIG. 3. The table is saved at a predetermined area in the memory unit 12.

As mentioned above, when output files and a plurality of maximum numbers of records for the output files are defined in accordance with information indicated by a user, a pointer i and a counter N for counting the number of records are initialized; that is, i=0 and N=0 in step S3. Then, in step S4, it is checked whether an output database is created after a plurality of databases are merged and sorted in the merging and sorting processes.

When the output database is created, the pointer i is incremented by 1; that is, i=1 in step S5. Accordingly, an output file i (=1) is indicated by the pointer i (=1) and then is opened in step S6. Moreover, in step S7, it is checked whether a value N+1 (=1) resulted by adding 1 to the counter N is less than or equal to the maximum number Ni (i=1) of records defined for the output file Ni (i=1). When the value N+1 is less than or equal to the maximum number N1 of records defined by the user, the first record is retrieved from the output database and saved into the output file i (i=1) that is opened, in step S8. Then, the counter N is incremented by 1; that is, N=1 in step S9.

The output file controlling process goes back to the step S7. It is checked whether a value N+1 (=2) resulted by adding 1 to the counter N is less than or equal to the maximum number Ni (i=1). When the value N+1 (=2) is less than or equal to the maximum number Ni (i=1), the next record is retrieved from the output database and stored into file i (i=1) in step S8. The counter N is incremented by 1; that is, N=2 in step S9.

The steps S7, S8 and S9 are repeated while a value N+1 resulting in adding 1 to the counter N is less than or equal to the maximum number N1. And each record from the output database is sequentially stored into the output file i (=1). When a value n+1 resulted by adding 1 to the counter N exceeds the maximum number Ni (i=1), that is, N+1>Ni, the counter N is reset (N=0) in step S10. Accordingly, the output file Ni (i=1) is closed in step S11.

Thereafter, in step S12, it is checked whether the pointer i exceeds the number n of the output files defined by the user, that is, whether all output files defined by the user have completed storing data. When the pointer i does not exceed the number n of output files, the pointer i is incremented by 1 (i=2) and then an output file i (=2) indicated by the pointer i is opened in step S6.

The steps S7 through S9 for storing records from the output database to the output file i (i=2) are repeated such that those steps are executed for output file i (i=2). When a value N+1 resulted by adding 1 to the counter N exceeds the maximum number Ni (i=2) of records defined for the output file i (i=2) (See FIG. 3), the counter N is reset; that is, N=0 in step S10. Then, the output file i (i=2) is closed in step S11.

As mentioned above, records are retrieved sequentially from the output database and stored into the output file i indicated by the pointer i. When the number N+1 of records stored in the output file i exceeds the maximum number Ni of records defined for the output file i, the output file i is closed. Subsequently, the pointer i is incremented by 1 so that the output file i is changed to an output file i+1 to save the following records. These steps (S5 through S12) are repeated. When the pointer i reaches the number n of the output files (YES at step S12), that is, all output files 1 through n defined by the user store records, the output file controlling process is completed.

When the output file controlling process is completed, records which were stored in the output database are divided and stored in the output files 1 through n. The number of records stored in each output file i is equal to the maximum number Ni defined for the output file i.

In the output file controlling process as mentioned above, a large volume of data (records) in the output database created after the merging and sorting processes is divided in accordance with the numbers of records defined by the user for a plurality of output files defined by user. Then, each divided data (records) is saved in a corresponding output file. The plurality of output files are stored in the storage device 20. Accordingly, in the computer system, the plurality of output files are used as secondary databases.

Examples in which data of a database created after the merging and sorting processes is divided and saved in a plurality of output files will now be explained.

For instance, in the output file controlling process, it can be realized that data of a new database, which is created after databases of monthly product sales for five branches (branch offices A through E) are merged and sorted in the merging and sorting processes, is divided and stored in a plurality of output files.

A database of monthly product sales for each branch may be a database as shown in FIG. 4. In FIG. 4, each record in the database includes the following items: "branch office name", "data", "unit price of product 1", "units sold of product 1", "gross sales of product 1", "unit price of product 2", "units sold of product 2", "gross sales of product 2" and "total sales of products 1 and 2". Also, the database includes twelve monthly records (12 fiscal months).

Figure 5:
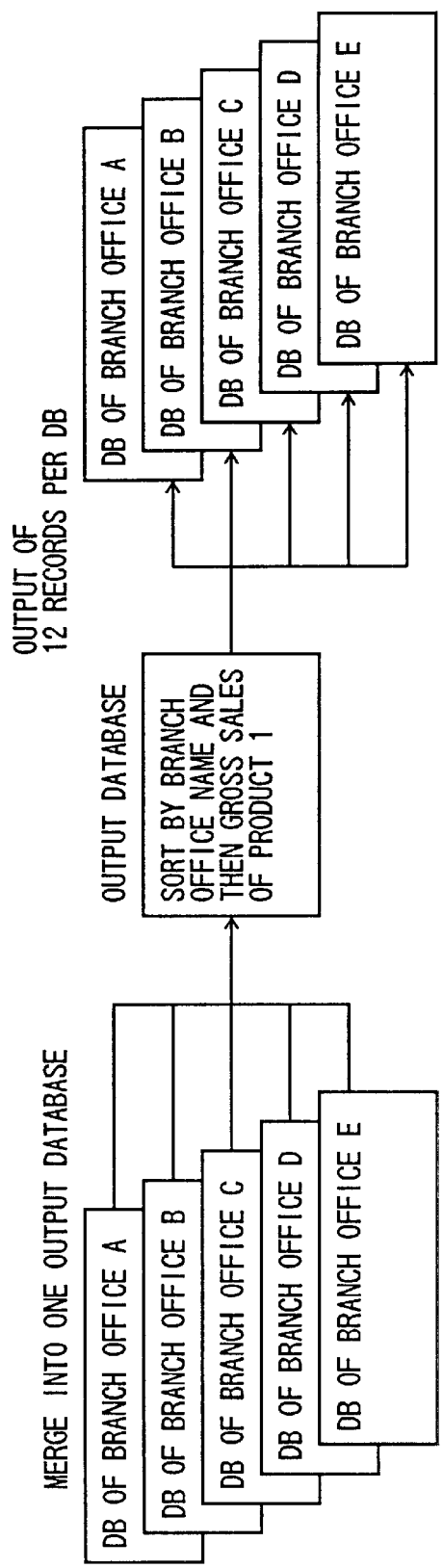
FIG. 5 is a diagram illustrating a first example of a database structure converted by merging and sorting processes and the output file controlling process.

As shown in FIG. 5, for example, in the merging and sorting processes, the five databases for branch offices A through E are merged into one output database and then the output database is sorted by the branch office name as a first key and sorted by the gross sales of product 1 as a second key. As the result of the merging and sorting processes, the output database is ordered by branch offices A through E and also records are ordered by the gross sales of product 1 in each of twelve monthly records in each branch office. Thus, the new output database includes 60 monthly records (12 monthly records×5 branches) that are ordered by the first key and the second key.

It is assumed that five output files (n=5) are defined and the maximum number of records to store into each output file is set as "12" ($N_1=N_2=N_3=N_4=N_5=12$). Then, 60 monthly records obtained after the merging and sorting processes are sequentially grouped by every 12 monthly records and saved into each of five output files. As a result, each of five output files for branch offices A through E stores a database having twelve records in each of which data is ordered by the gross sales of product 1.

Conventionally, when it is needed to change constructions (data arrangement) of a plurality of databases, it is required to separately sort data of each database. On the contrary, by combining the merging and sorting processes with the output file controlling process, the constructions (data arrangement) of the plurality of databases can be changed at one time.

Figure 6:
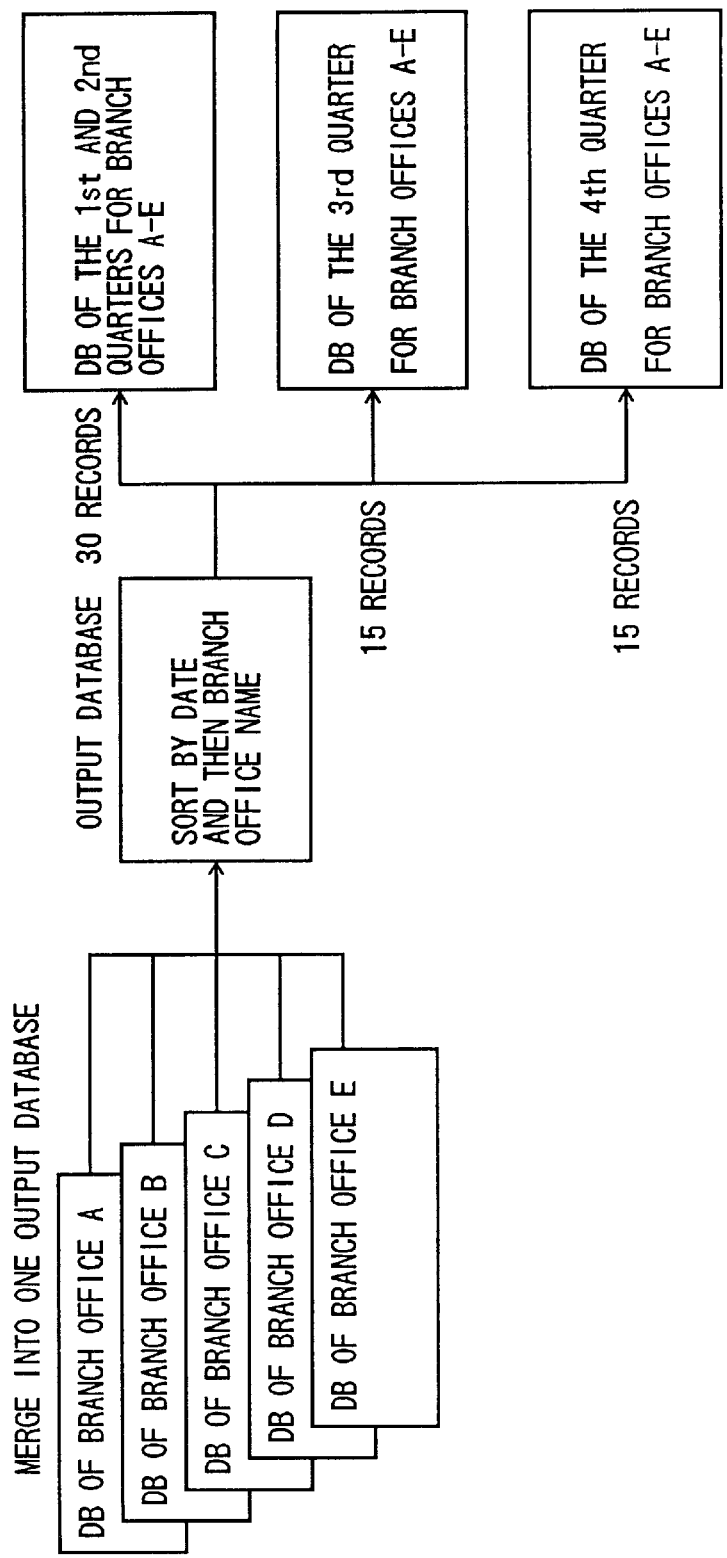
FIG. 6 is a diagram illustrating a second example of a database structure converted by merging and sorting processes and the output file controlling process.

In such an example as shown in FIG. 6, all data in five databases for the branch offices A through E are merged into one output database to sort by the "date" as a first key and then by the "branch office name" as a second key during the merging and sorting processes. As a result of the merging and sorting processes, a new output database is created. Data of the entire output database is sorted by month, and data in every month is grouped by the "branch office name" in sequential order as one record each. Thus, the output database includes 60 records (5 records for 5 branches×12 months).

Thereafter, three output files (n=3) are defined and maximum numbers of records therefor are set to 30, 15 and 15 ($N_1=30$, $N_2=15$, $N_3=15$) respectively. Then, the output file controlling process mentioned above is executed. From the 60 records obtained after the merging and sorting processes, the first 30 records are stored in an output file 1, the following 15 records are stored in an output file 2 and the last 15 records are stored in an output file 3. As a result, the output file 1 includes sales data for branch offices A through E during the first and second quarters (January through June), that is, 5 records for 5 branches×6 months=30 records. The output file 2 includes sales data for branch offices A through E during the third quarter (July through September), that is, 5 records for 5 branches×3 months=15 records. The output file 3 includes sales data for branch offices A through E during the fourth quarter (October through December), that is, 5 records for 5 branches×3 months=15 records.

In this example, two output files may be defined and the maximum number of each output file may be set to 30 ($N_1=N_2=30$). In this case, after the output file controlling process, the output file 1 includes sales data for branch offices A through E during the first and second quarters (January through June) and the output file 2 includes sales data for branch offices A through E during the third and fourth quarters (January through June).

Figure 7:
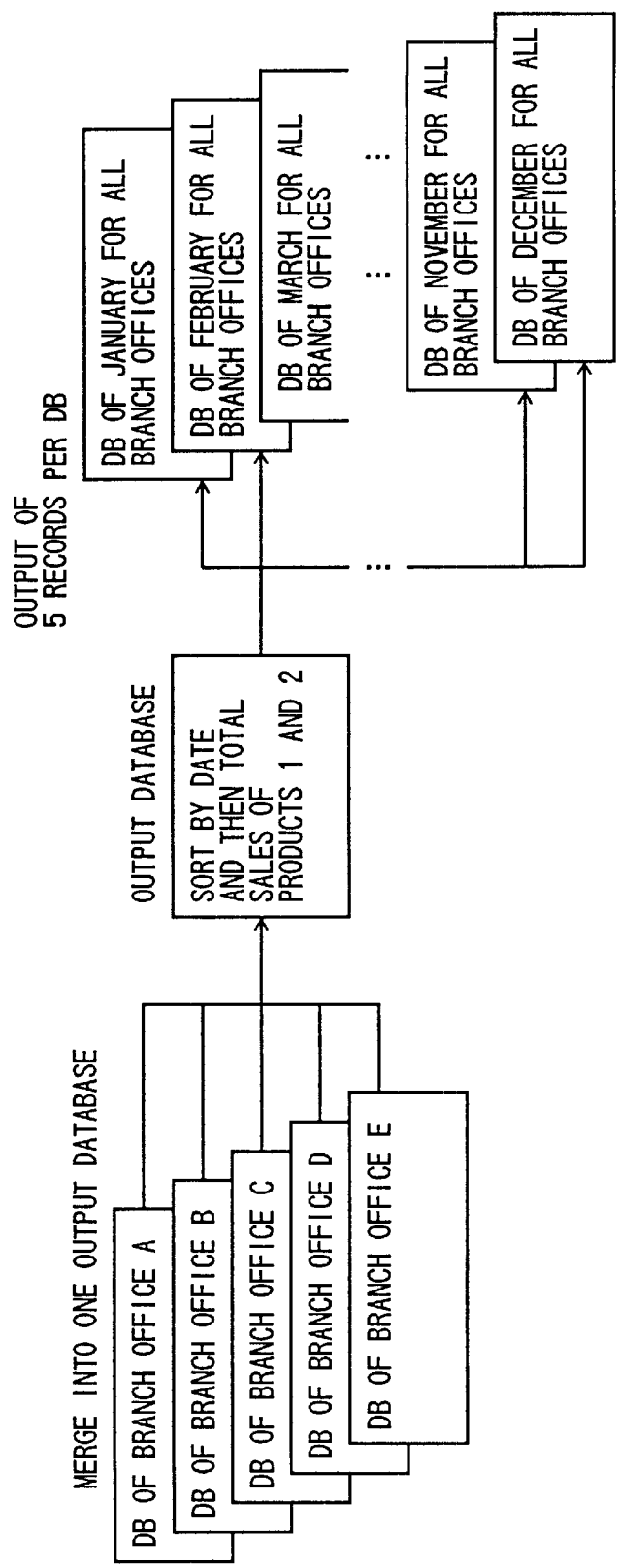
FIG. 7 is a diagram illustrating a third example of a database structure converted by merging and sorting processes and the output file controlling process.

In such an example as shown in FIG. 7, the five branch offices A through E are sorted by the "date" as a first key and then sorted by the "total sales of products 1 and 2" as a second key in the merging and sorting processes. As a result of the merging and sorting processes, a new output database is created. Data of the entire output database is sorted by month, and data in every month is grouped by the "total sales of products 1 and 2" in sequential order as one record each. Thus, the output database includes 60 records (5 records for 5 branches×12 months).

Thereafter, twelve output files (n=12) are defined and maximum numbers of records therefor are set to 5 ($N_1=N_2=\ldots=N_{11}=N_{12}=5$), respectively. Then, the output file controlling process mentioned above is executed. Accordingly, 60 records obtained after the merging and sorting processes are divided and saved in the twelve output files. As a result, each of the twelve output files includes each month sales data for all branch offices A through E.

Figure 8:
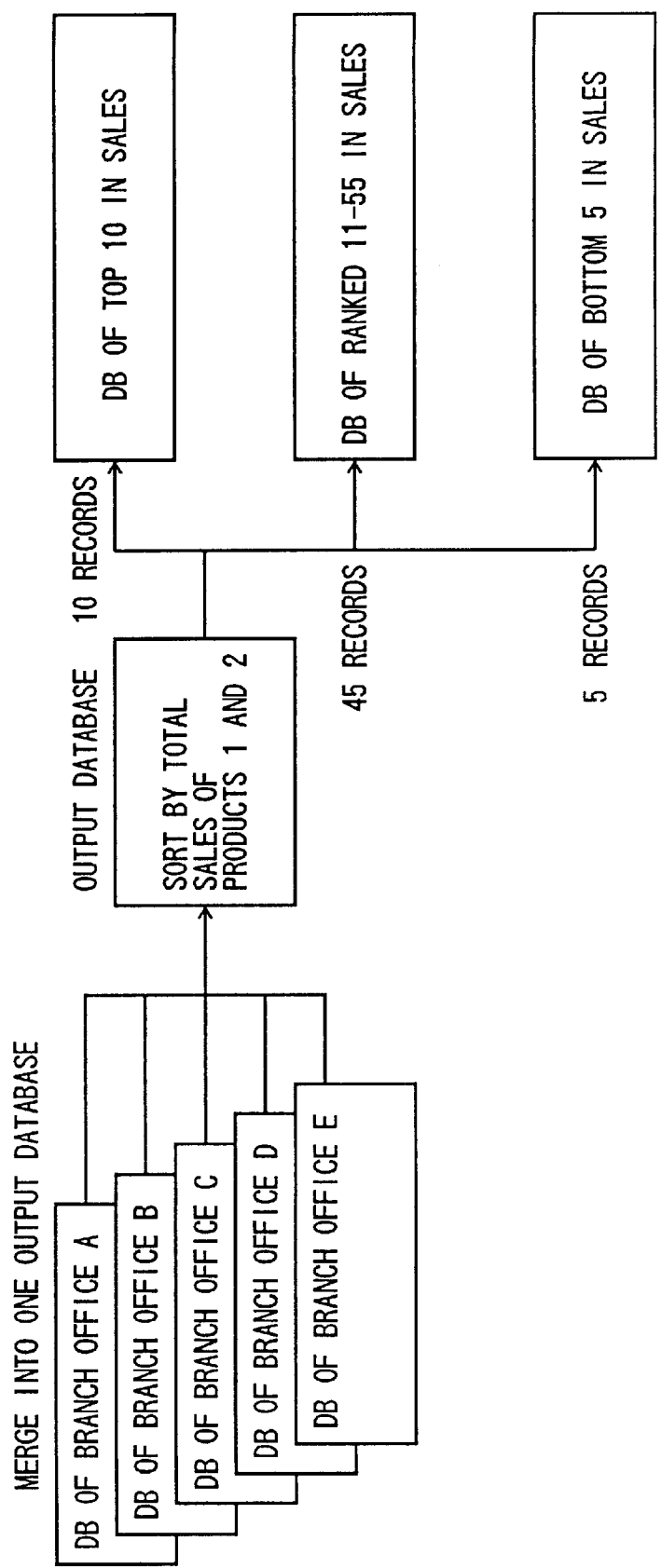
FIG. 8 is a diagram illustrating a fourth example of a database structure converted by merging and sorting processes and the output file controlling process.

In such an example as shown in FIG. 8, five databases for the five branch offices A through E are merged and sorted by the "total sales of products 1 and 2" in the merging and sorting processes. As the result of the merging and sorting processes, a new output database is created in which data is sequentially sorted by the "total sales of products 1 and 2".

Thereafter, three output files (n=3) are defined and maximum numbers of records therefor are set to 10, 45 and 5 ($N_1=10$, $N_2=45$, $N_3=5$), respectively. Then, the output file controlling process mentioned above is executed. From the 60 records obtained after the merging and sorting processes, the first 10 records are stored in an output file 1, the following 45 records are stored in an output file 2 and the last 5 records are stored in an output file 3. As a result, the output file 1 includes the top 10 monthly sales, the output file 2 includes the 11th through 55th monthly sales and the output file 3 includes the bottom 5 monthly sales.

As mentioned above, by combining the merging and sorting processes and the output controlling process, new databases can be created from a plurality of databases by changing constructions of the plurality of databases.

Figure 9:
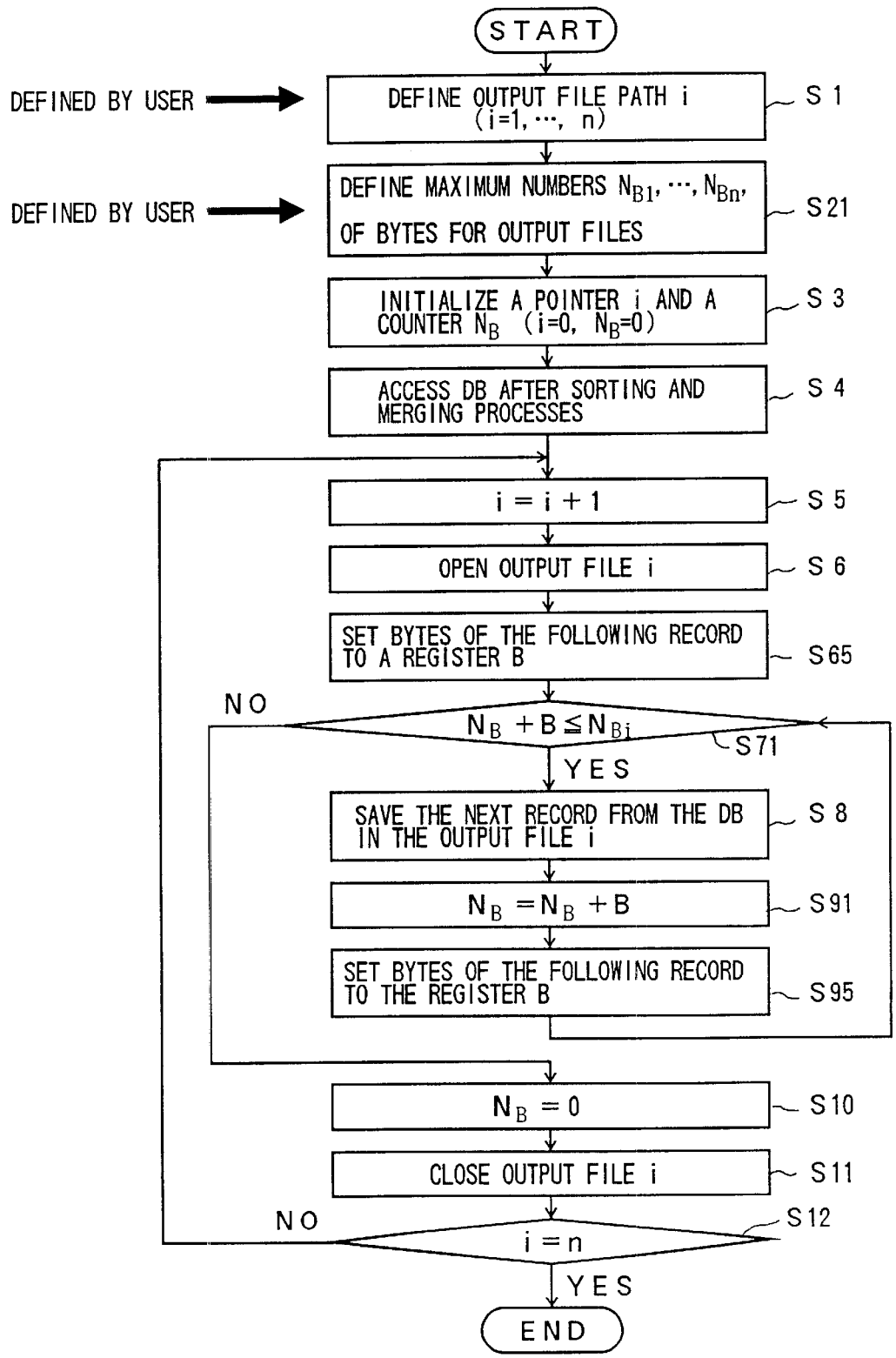
FIG. 9 is a flowchart showing another example of the output file controlling process.

The output file controlling process as mentioned above (See FIG. 2) is not limited to indicating a maximum volume of data possible to store in each output file by the number of records. For example, the maximum volume of data may be indicated by the number of bytes. In this case of indicating the maximum volume of data by the number of bytes, for example, the output file controlling process is executed in accordance with steps as shown in FIG. 9. In FIG. 9, steps that are the same as those shown in FIG. 2 are given the same reference numbers.

In FIG. 9, output files 1 through n are defined based on information entered from the input unit 14 by a user. Then, maximum numbers NB1 through NBn of bytes possible to store in the output files 1 through n are defined by the user in step S21. The defined output files 1 through n and the maximum numbers NB1 through NBn of bytes for the defined output files 1 through n, correspond to each other in a table such as a table shown in FIG. 3.

In this condition, after the output file i is opened in step S6, the number of bytes (B bytes) of the following record from the output database is checked and saved in a register B in step S65. Subsequently, it is checked whether a value NB+B resulting from adding the number of bytes (B bytes) for the following record to the counter NB is less than or equal to the maximum number NBi defined as the number of bytes possible to store in the output file i in step S71. When the value NB+B is less than or equal to the maximum number NBi of bytes, the following record is retrieved from the output database and stored into the output file i in step S8. Then, the counter NB is incremented by B bytes in step S91. Further, the register B is reset by the number of bytes (B bytes) of the following record that is to be retrieved in step S95.

The steps S71, S8, S91 and S95, in which the number of bytes (B bytes) of the following record is checked and the record is stored in the output file i, are repeated until the value NB+B exceeds the maximum number NBi of bytes possible to store in the output file i.

During the steps, when the value NB+B resulting from adding the number of bytes (B bytes) for the following record to the counter NB exceeds the maximum number NBi of bytes possible to store in the output file i, the counter NB is reset in step S10 and the output file i storing data is closed. In order to change the next output file, the pointer i is incremented by 1 (i=i+1). By the same method, an output file i+1 indicated by the pointer i+1 is processed.

In the steps mentioned above, records sequentially retrieved from the output database are stored in all output files defined by the user. That is, data in the output database is divided in accordance with information of the output files and stored in the output files. The number of bytes stored in each output file i is less than or equal to the maximum number of bytes possible to store therein.

In the examples mentioned above, the step S2 in FIG. 2 and the step S21 in FIG. 9 correspond to the maximum capacity setting part in the claims. Also, the steps S7, S8 and S9 in FIG. 2 and the steps S71, S8 and S91 in FIG. 9 correspond to the judging part in the claims. Moreover, the steps S12 and S5 in FIG. 2 and FIG. 9 correspond to the output file switching part.

The present invention is not limited to the specifically disclosed embodiments, variations and modifications; and other variations and modifications may be made without departing from the scope of the present invention.

The present application is based on Japanese Priority Application No. 11-045299 filed on Feb. 23, 1999, the entire contents of which are hereby incorporated for reference.

What is claimed is:

1. A data processing system for processing a set of data, said data processing system comprising:

a maximum capacity setting part setting a maximum capacity of data corresponding to each of a plurality of output files in accordance with information from an input unit operated by a user;

a database, which is to be divided and stored in the plurality of output files, including a plurality of records;

a sorting part sorting the plurality of records in accordance with a predetermined order;

a judging part judging whether a total volume of data stored in a current output file, which is one of the plurality of output files, reaches said maximum capacity corresponding to the current output file when data is processed and stored in the current output file; and an output file switching part switching the current output file to another of the plurality of output files when it is judged that the total volume of data stored in the current output file reaches said maximum capacity corresponding to the current output file, whereby said plurality of records sorted in the predetermined order in said database are stored sequentially in said plurality of output files by said output file switching part in accordance with the maximum capacity for each of said plurality of output files.

2. The data processing system as claimed in claim 1, further comprising:

an output file defining part selectively defining said plurality of output files to store the set of data in accordance with information from the input unit so that said maximum capacity setting part sets the maximum capacity for each of the plurality of output files defined by the output file defining part.

3. The data processing system as claimed in claim 1, wherein said set of data, which is to be divided and stored into the plurality output files, is composed of a plurality of records, said maximum capacity setting part sets the maximum capacity of records for each of the plurality of output files in accordance with information from the input unit, and said judging part comprises a record counting part counting a number of records when the records are sequentially stored into a current output file whereby it is judged whether the number of records reaches the maximum capacity being set for the current output file, so that said set of data is divided and stored in the plurality of output files by said output file switching part.

4. A computer-readable recording medium recorded with a program for causing a computer to process a set of data, said program comprising the codes of:

(a) setting a maximum capacity of data corresponding to each of a plurality of output files in accordance with information from an input unit operated by a user;

(b) sorting a plurality of records in a database, which is to be divided and stored in the plurality of output files in accordance with a predetermined order;

(c) judging whether a total volume of data stored in a current output file, which is one of the plurality of output files, reaches said maximum capacity corresponding to the current output file when data is processed and stored in the current output file; and (d) switching the current output file to another of the plurality of output files when it is judged that the total volume of data stored in the current output file reaches said maximum capacity corresponding to the current output file, whereby said plurality of records sorted in the predetermined order in said database are stored sequentially in said plurality of output files by said output file switching part in accordance with the maximum capacity for each of said plurality of output files.

5. The computer-readable recording medium as claimed in claim 4, further comprising the codes of:

defining said plurality of output files to store the set of data in accordance with information from the input unit so that said maximum capacity is set for each of said plurality of output files by said code (a).

6. A business data processing system for processing a set of sales achievement data, said business data processing system comprising:

a maximum capacity setting part setting a maximum capacity of data corresponding to each of a plurality of output files in accordance with business ranges from an input unit operated by a user;

a database, which is to be divided and stored in the plurality of output files, including a plurality of records having sales achievement data provided from a plurality of branch offices;

a sorting part sorting the plurality of records in accordance with a predetermined order; and a judging part judging whether a total volume of data stored in a current output file, which is one of the plurality of output files, reaches said maximum capacity corresponding to the current output file when data is processed and stored in the current output file; and an output file switching part switching the current output file to another of the plurality of output files when it is judged that the total volume of sales achievement data stored in the current output file reaches said maximum capacity corresponding to the current output file, whereby said plurality of records sorted in the predetermined order in said database are stored sequentially in said plurality of output files by said output file switching part in accordance with the maximum capacity for each of said plurality of output files.

* * * * *